MULCHER

Original Filed June 12, 1957 2 Sheets-Sheet 1

Clyde H. Heeren,
Inventor.
Koenig and Pope,
Attorneys.

Sept. 11, 1962 C. H. HEEREN Re. 25,237

MULCHER

Original Filed June 12, 1957 2 Sheets-Sheet 2

Clyde H. Heeren,
Inventor.
Koenig and Pope
Attorneys.

United States Patent Office

Re. 25,237
Reissued Sept. 11, 1962

25,237
MULCHER

Clyde H. Heeren, Rte. 1, Walshville, Ill.

Original No. 2,983,322, dated May 9, 1961, Ser. No. 665,174, June 12, 1957. Application for reissue July 24, 1961, Ser. No. 128,622.
4 Claims. (Cl. 172—523)

Matter enclosed in heavy brackets [ ] appears in the original patent but forms no part of this reissue specification; matter printed in italics indicates the additions made by reissue.

This invention relates to mulchers, and with regard to certain more specific features, to mulcher attachments for seed-planting equiment such as corn planters and the like.

Among the several objects of the invention may be noted the provision of a mulcher for seed-planting equipment which automatically prepares mulched seed bed strips in a plowed field as the equipment traverses the field; the provision of a mulcher of the class described which requires no preliminary preparation of the plowed field (such as disking, harrowing or the like) and which leaves the field in a superior loose, moisture-retaining condition for rapid seed germination and growth; the provision of an adjustable mulcher head in apparatus of the class described which may be adapted conveniently to various field conditions, and which will not be fouled by old vegetation to be mulched or by impediments such as stones and the like; and the provision of apparatus of the class described which is simple in form and operation and which may be conveniently employed as an agricultural machine attachment. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIGURE 1 is a top plan view showing the parts relating to the invention in solid lines and in dotted lines a typical double-unit corn-planting rig to which it may be attached;

Corresponding reference characters indicate corresponding parts throughout the several views of the drawings.

While the present invention has application to various seed-planting equipment, for purposes of disclosure it is shown as applied to a corn planter. Present-day planting procedures involve first plowing a field, then harrowing or disking it in two or three operations, and then towing the corn-planting equipment over it for spacedly dropping the seed in rows on the surface thus prepared. This process has the disadvantage that the plowed clods of the entire area of the field are more or less finely broken up by harrowing and disking. This leads ultimately to undue packing of the soil, so that it will not as well hold moisture during dry periods. I have found it preferable that a substantial area of the field be left in its original plowed condition; but seed cannot be dropped and expected properly to grow well in a field that is merely plowed because of the coarseness of the clods.

By means of the present invention, disking, harrowing and like operations, *after plowing*, are eliminated, so that directly after a field has been plower the planting equipment may be towed over it with my mulching attachment, to provide a superior field in which are mulched seed bed strips, said strips being flanked by otherwise untreated plowed ground which is superior to harrowed and disked ground in moisture-holding and drainage characteristics.

Figure 1:
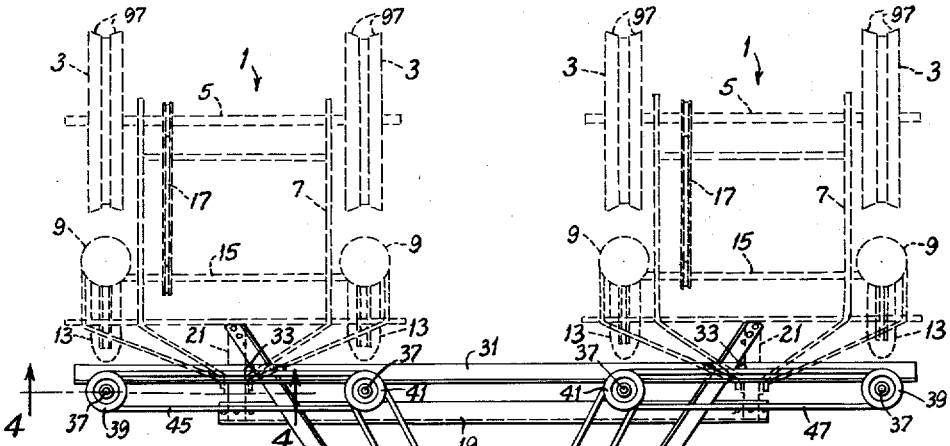
Figure 2:
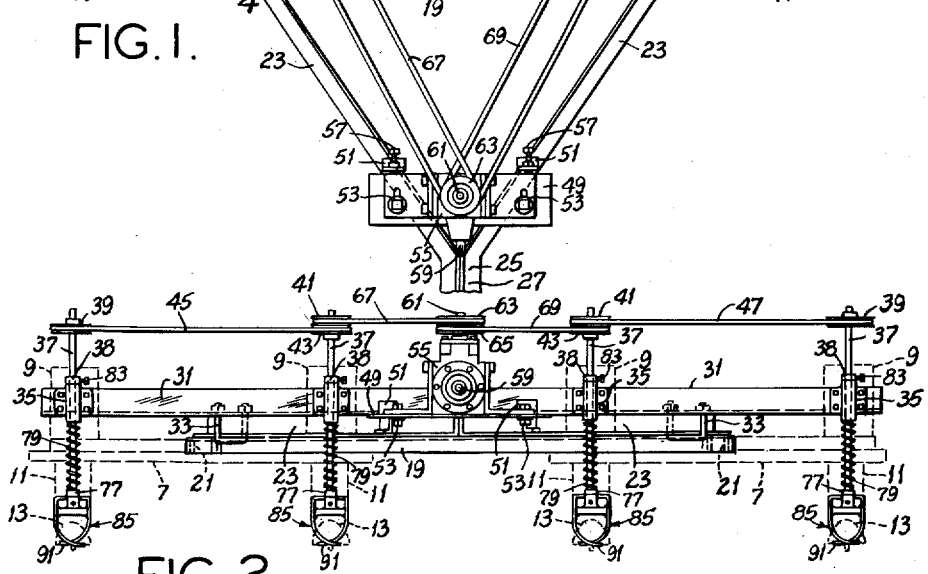
FIGURE 2 is a front elevation of FIGURE 1.
Figure 3:
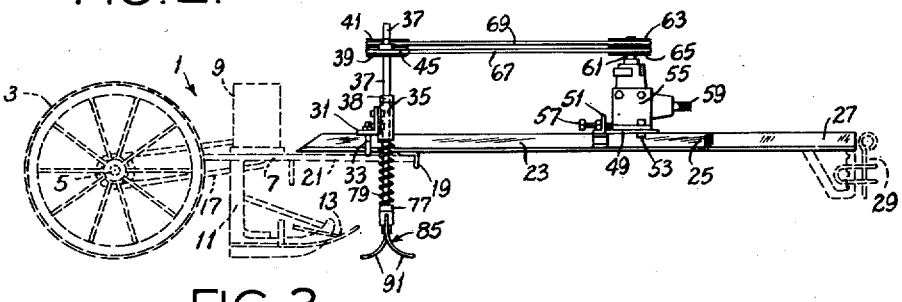
FIGURE 3 is a left side elevation of FIGURES 1 and 2.

Referring now more particularly to FIGURES 1–3, there is shown at numerals 1 conventional ganged (two) corn-planting machine rigs, each of which has a pair of wheels 3 of the usual form, adapted lightly to hill soil over the seeds that are dropped ahead of the wheels. The wheels 3 are attached to live axles 5 in frames 7. Carried on the frames 7 are seed containers 9, located above seed-dropping chutes 11, leading to and through the usual sliding soil-grooving shoes 13. Included in each assembly of parts 9, 11 and 13 is a conventional mechanism adapted to drop seeds at intervals, this mechanism being driven by means of a chain drive 17 from a shaft 15 driven from the respective live axle 5. Various adjusting means usually carried on conventional rigs such as 1 are understood to be included but are not shown, being unnecessary to the present disclosure.

An appropriate corn planter may be either of the so-called drill type or hill drop type, depending upon soil conditions, the former dropping one kernel at approximately equal intervals, the latter dropping several kernels at greater, more accurately spaced intervals. Rigs such as 1 may be employed individually or may be gang-operated, two being shown by way of example, it being understood that gangs of more than two may be used. In order to gang them, they are usually connected by means of a crossbar such as shown at 19, fastened to the front tongues 21 of the rigs. Angle bars 23 are fastened to the members 19 and 21, being forwardly jointed as shown at 25 to form a drawbar 27. The angle bars 23 form the supporting frame for my attachment. At the forward end of the drawbar portion 27 is located the usual hitch 29 for attachment to a conventional farm tractor for towing purposes. Such tractors usually incorporate at their rear ends so-called take-off drives.

At numeral 31 is shown a crossbar supported on the rear portions of the angle bars 23, being fastened thereto by means of U-bolts 33. At spaced intervals on the crossbar 31, corresponding to the spacing of seed bed strips to be formed, are bolted vertical sleeve bearings 35. Each of the bearings supports a rotatable drive shaft or spindle 37, held in proper elevation by means of an upper collar 38 thereon. The outer shafts 37 carry single V-sheaves 39 and each of the inner ones carries two V-sheaves 41 and 43. Sheaves 39 and 43 on the left side of the machine are connected by means of a V-belt 45 and sheaves 39 and 41 on the right side are connected by means of a V-belt 47.

Attached to the converging front ends of the angle bars 23 is a flat supporting plate 49 and angle irons 51. Adjustably held to the plate 49 by means of an adjustable bolt and slot combination 53 is a speed step-up gear box 55. Its position is adjusted by means of adjusting screws 57, threaded through the angle irons 51. The gear box 55 has a horizontal input shaft 59 and a vertical output shaft 61. Its internal gear train is adapted to step up a speed of approximately 575 r.p.m. at shaft 59 to approximately 750 r.p.m. at shaft 61. The end of shaft 59 is arranged for a conventional connection with the power take-off of the tractor used in towing the device.

Sheaves 63 and 65 are carried on the upper end of the shaft 61. Upper sheave 63 is connected with sheave 41 y means of a belt drive 67. Lower sheave 65 is con-ected with the right-hand sheave 43 by means of a belt rive 69. All of the sheaves 39, 41, 43, 63 and 65 have ıe same pitch diameters, so that the speeds of shafts 7 are all equal to the stepped-up speed of shaft 61.

Figure 4:
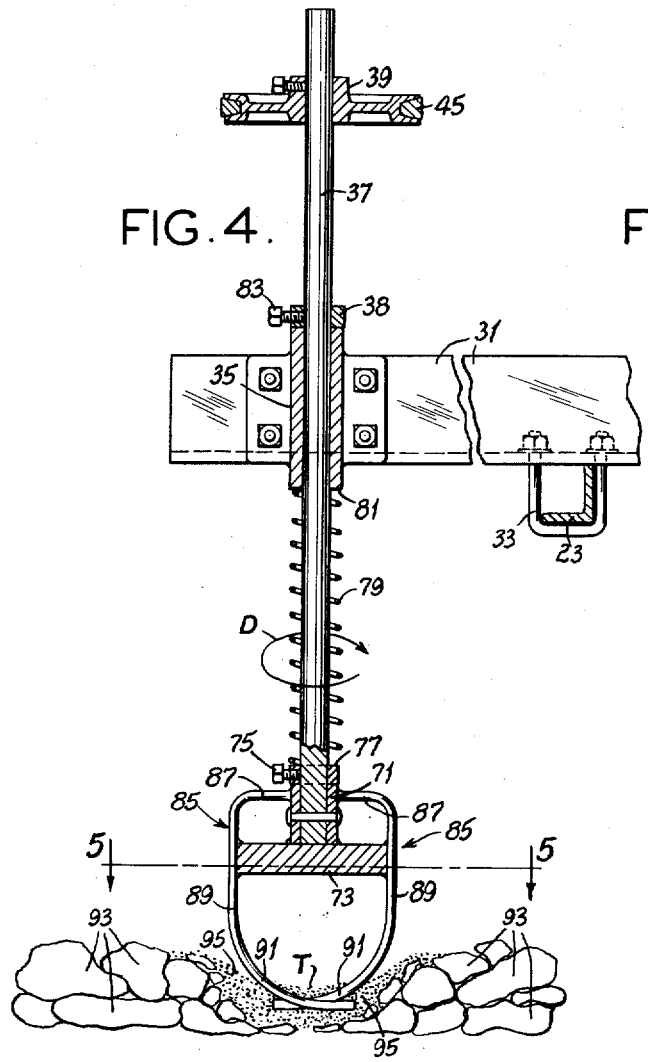
FIGURE 4 is an enlarged vertical section taken on the line 4—4 of FIGURE 1, showing one mulcher head and its drive shaft in operating position in a plowed field.
Figure 6:
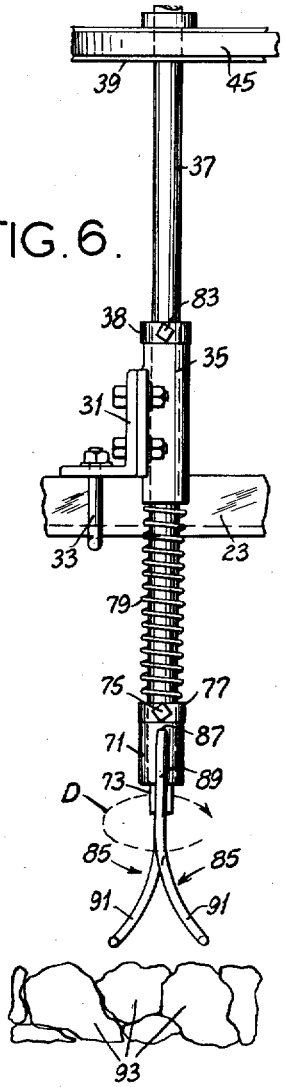
FIGURE 6 is a left end elevation of FIGURE 4 but illustrating an adjustment in which the mulcher head is in inoperative position.
Figure 5:
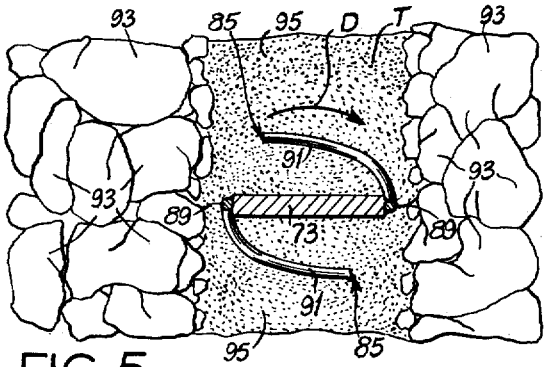
FIGURE 5 is a horizontal section taken on line 5—5 of FIGURE 4.

A typical mulcher head associated with each shaft 37 shown in FIGURES 4–6. Theses figures illustrate the ;ft-hand shaft 37 of FIGURES 1 and 2. Since all ıulcher heads on the shafts 34 are the same, a descrip-on of one will be sufficient for all. Each shaft 37 has inned at its lower end a sleeve 71 to which is welded a 'ansverse crossbar 73. The sleeve and crossbar con-itute an inverted T-shape. Adjustably attached to the ıaft 37 by means of a set screw 75 is a collar 77. A ɔmpression spring 79 reacts between the collar 77 and ıe lower end 81 of the bearing 35. Thus the shaft 37 is iased downward by action of the spring 79 on the collar 7 to the limit shown in FIGURE 4. This limit is ;tablished by the position of collar 38 on shaft 37. The ɔllar 38 limits the protrusion of the shaft 37 out of the ɔwer end of the bearing 35. If it is desired to increase ıe downward biasing force on the shaft 37, this may be ɔne by loosening the set screw 75, raising the collar 7 and again tightening the former. The amount of ɔwnward protrusion of the shaft 37 may thus be ad-ısted by adjusting the position of collar 38 thereon. he set screw 83 is provided for the purpose of making ıis adjustment.

Mulching fingers 85, composed of ⅜" circular rod-like ock, for example, are attached to sleeve 71 and bar 73. ach mulching finger is constituted by a horizontal angled ɔrtion 87, the end of which is welded to the sleeve 71. ach finger is right-angularly bent to provide a down-ardly directed section 89 welded to one end of the cross-ar 73. The vertical portions 89 are approximately 7" ɔart. Below the vertical portions 89 the fingers are vept rearward and anticlockwise, as shown at 91. Thus ith respect to the clockwise direction of rotation shown y the dart D, the lower portions of these fingers con-itute rearwardly sweeping springy spiral portions. These ɔrtions terminate in substantially horizontal trailing free ıds as shown in FIGURES 4–6. As shown in FIGURE the angle around the axis of shaft 37 subtended by ıch finger throughout its spiral sweep and horizontal ee end exceeds ninety degrees.

Operation is as follows, assuming that by means of de-ce 29 a hitch has been made to a tractor and that the actor take-off mechanism is connected with the shaft ); also that the seed containers 9 have been filled.

The apparatus is towed in parallel adjacent paths across field that has merely been plowed in preparation for anting. The collars 38 are adjusted so that the mulcher ıgers enter the plowed soil at the desired depth and e collar 77 is adjusted for correct resilient action of the ıgers in the soil, as illustrated in FIGURE 4. The rger plowed clods of the field are illustrated at nu-erals 93. Then as the tractor tows the rigs 1 and 'ives the gear box 55, the shafts 37 become rotated ockwise at, say, 750 r.p.m. As the rig advances over e field, the spinning spirally trailing springy fingers 85 'oduce mulched seed bed strips, breaking up the clods ; along each strip into finer particles and mulch 95, e depth of which is dependent upon the adjustment of e collars 38 and 77. The rotary centrifugal action of e fingers [83] *85* results not only in breaking up the ɔds but acts as a classifier, the finest particles appear-g along the center of the trench thus formed, the ıarser particles being spun out more or less laterally, ith the coarser unbroken clods between the seed bed rips. It will be understood that in any plowed field ere exists fibrous organic material due to a former ;ar's growth including old roots, corn stalks, grass, eeds, et cetera. This is broken up and mulched into e fine earth particles in the trench T. Since the spiral veep of the fingers is downward and rearward with respect to rotation, these fibrous materials are not caught on the ends of the mulching fingers, but are wiped off during the mulching action, keeping them bright and clean. Moreover, the downward spiral trailing form of the fingers assures that if any obstructions are met with in the soil, such as rocks, and the like, the fingers will have a spiraling upward skewing action against compression of springs 79, causing them to ride over the obstruction without damage.

As the machine advances, the conventional shoes 13 of the planting rigs 1 follow the mulchers in the trenches, dropping or inserting seeds at timed intervals. The following wheels 3, which have double concave flanges as illustrated at 97, serve to push soil over the seeds without undue packing. All of the soil of the field, except that mulched in the trenches T, is left in the merely plowed clod form, which is ideal for holding moisture during dry periods for later absorption by the finer mulched materials in the trenches. This is also ideal in reducing wind erosion in drier regions.

As illustrated in FIGURE 6, when it is desired to tow the rig away from the field, the shafts 37 [may be raised by adjusting the collars 38 downward, thus raising the mulching fingers 85 into] *are raised. Thereupon, the adjusting collars 38 are moved downwardly on their respective shafts 37 into abutting engagement with the upper and adjacent ends of the vertical sleeve bearings 35, and their respective set or locking screws tightened or engaged with the shafts. Thus, the mulching fingers 85 will be retained in* idle position above the surface of the earth, *as is shown in FIGURE 6 of the drawings.* In this position they may be left to rotate during towing or, if desired, the connection between the tractor take-off and shaft 59 may be disconnected. In some cases, power take-offs have decoupled clutches, which can be used for the purpose of stopping rotation of fingers 91.

In view of the above, it will be seen that the invention has the following advantages:

(1) The apparatus is simple in form and adaptable as an attachment to various planting rigs.

(2) The only preparation required for a field to be planted is plowing it, no harrowing, disking or the like being required.

(3) The mulching action of the relatively high-speed mulching fingers prepares a much better mulched surface into which to drop the seeds. This surface is restricted to narrow seed bed strips or trenches, leaving the remainder of the field in plowed form adapted better to retain moisture and to resist wind erosion.

(4) The spinning rearwardly spiraling fingers classify the soil along the trench with the finer particles centrally located and the coarser ones transversely located against the coarser sides of the trench.

(5) The rearwardly and downwardly spiraling form of the fingers avoids their picking up and becoming clogged with fibrous material during operation, and results also in their ability to skew up and ride over obstructions without damage.

(6) The depth and character of the mulch in the trenches T may be independently controlled as desired by adjustments of the respective collars 38 and 77 and thus independent bed preparations may be made in adjacent trenches for different types of seeds, if desired.

(7) The entire construction is rugged, low-cost and troubleproof.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A rotary soil mulcher comprising a shaft rotatable about a substantially vertical axis, a transverse head on the lower end of said shaft, a plurality of spring fingers each of which is constituted by spring metal rod of substantially constant cross section and having an upper portion affixed to said head, each finger extending from its affixed portion in a substantial spiral sweep down and around said axis in a rearward trailing direction relative to the direction of rotation, and terminating in a trailing substantially horizontal soil-wiping free end, the angle around said axis subtended by each finger throughout its spiral sweep starting at said upper portion and terminating at said free end being at least ninety degrees.

2. A rotary soil mulcher comprising a shaft rotatable about a substantially vertical axis, a single transverse bar on the lower end of said shaft, a single spring finger affixed to each end of said bar and constituted by a spring metal rod of substantially constant circular cross section, each finger extending from its affixed portion in a substanttial spiral sweep down and around said axis in a rearward trailing direction relative to the direction of rotation, and terminating in a trailing substantially horizontal soil-wiping free end, the angle around said axis subtended by each finger throughout its spiral sweep starting at said upper portion and terminating at said free end being at least ninety degrees.

*3. A soil mulcher, comprising a shaft rotatable about a substantially vertical axis, a plurality of relatively spaced elongated curvilinear spring bodies, each of substantially constant cross-section throughout their respective lengths, fixedly connected at their respective upper end portions to the lower end of said shaft, each said bodies extending downwardly from the shaft in a spiral like sweep partially around said axis in a rearward trailing direction relative to the direction of rotation thereof, and the lower and trailing portions of said bodies terminating at least in ninety degrees relation to the upper portions thereof.*

*4. A soil mulcher, comprising a shaft rotatable about a substantially vertical axis, an elongated curvilinear spring body of substantially constant circular cross-section throughout its length fixedly connected at its upper end portion to said shaft, said body extending downwardly from the shaft in a substantially spiral sweep partially around said axis in a rearward trailing direction relative to the rotation thereof and terminating at least in ninety degree relation to the upper portion thereof.*

References Cited in the file of this patent or the original patent

UNITED STATES PATENTS

| | | |
|---|---|---|
| 30,554 | Hogle | Oct. 30, 1860 |
| 78,400 | Standish | May 26, 1868 |
| 89,791 | Quick | May 4, 1869 |
| 135,664 | Poundstone | Feb. 11, 1873 |
| 435,462 | Smith | Sept. 2, 1890 |
| 510,143 | Kelsey et al. | Dec. 5, 1893 |
| 1,198,589 | Shellaberger | Sept. 19, 1916 |
| 1,259,587 | Arnold | Mar. 19, 1918 |
| 1,506,042 | Bauer | Aug. 26, 1924 |
| 1,811,041 | Dennis | June 23, 1931 |
| 2,215,364 | Simmons | Sept. 17, 1940 |
| 2,420,500 | Schug | May 13, 1947 |
| 2,560,443 | Hosford | July 10, 1951 |
| 2,611,302 | De Bairos | Sept. 23, 1952 |
| 2,732,783 | Murphy | Jan. 31, 1956 |
| 2,749,826 | Bullington | June 12, 1956 |
| 2,848,932 | Hopkins | Aug. 26, 1958 |
| 2,912,055 | Buddingh | Nov. 10, 1959 |